United States Patent

Ruoss

[11] Patent Number: 5,810,278
[45] Date of Patent: Sep. 22, 1998

[54] PROCESS FOR PROVIDING A STATOR CORE WITH STATOR WINDINGS

[75] Inventor: Gerhard Ruoss, Neidlingen, Germany

[73] Assignee: Ruoss Spezialmaschinen, Neidlingen, Germany

[21] Appl. No.: 719,402

[22] Filed: Sep. 24, 1996

Related U.S. Application Data

[62] Division of Ser. No. 335,081, Nov. 7, 1994, Pat. No. 5,596,796.

[30] Foreign Application Priority Data

Nov. 5, 1993 [DE] Germany ............................... 4337870.6

[51] Int. Cl.⁶ ....................................................... H02K 1/16
[52] U.S. Cl. ..................................... 242/432.5; 242/432.6; 29/596
[58] Field of Search ........................... 29/596; 242/432.5, 242/432.4, 432.6

[56] References Cited

U.S. PATENT DOCUMENTS

| | | |
|---|---|---|
| 2,810,848 | 10/1957 | Roberts . |
| 2,936,961 | 5/1960 | Roberts . |
| 2,972,449 | 2/1961 | Roberts ................................ 242/432.6 |
| 3,055,601 | 9/1962 | Roberts ................................ 242/432.6 |
| 3,227,382 | 1/1966 | Frederick ............................. 242/432.6 |
| 3,253,792 | 5/1966 | Brown et al. ......................... 242/432.6 |
| 4,492,344 | 1/1985 | Baumann et al. .................... 242/432.6 |
| 4,498,636 | 2/1985 | Boesewetter et al. ................ 29/596 X |
| 4,520,965 | 6/1985 | Kimura et al. . |
| 5,025,997 | 6/1991 | Shi et al. .............................. 29/596 |
| 5,095,610 | 3/1992 | Schultz et al. ....................... 29/596 |
| 5,370,324 | 12/1994 | Beakes et al. ........................ 29/596 X |
| 5,502,341 | 3/1996 | Sato ...................................... 29/596 |

FOREIGN PATENT DOCUMENTS

| | | |
|---|---|---|
| 132660 | 5/1949 | Australia . |
| A 1153754 | 3/1958 | France . |
| 1011505 | 7/1957 | Germany . |
| 1021465 | 12/1957 | Germany . |
| 1033320 | 7/1958 | Germany ............................ 242/432.5 |
| 1203870 | 10/1965 | Germany . |
| 1247457 | 8/1967 | Germany . |
| 2031756 | 2/1971 | Germany . |
| 3709687 | 10/1988 | Germany . |
| 58-195452 | 11/1983 | Japan . |
| 59-178947 | 10/1984 | Japan . |
| A 444950 | 2/1968 | Switzerland . |
| A 493137 | 8/1970 | Switzerland . |

*Primary Examiner*—Katherine Matecki
*Attorney, Agent, or Firm*—Woodcock Washburn Kurtz Mackiewicz & Norris LLP

[57] ABSTRACT

A process and an apparatus for providing a stator plate with windings where the stator plate has several stator slots distributed in a circumferential direction which are formed between poles and a stator core and end face disks formed of an electrically insulating material mounted on both faces, the end face disk having a winding wire receiver space lying radially and axially outside of the stator slots and running in the circumferential direction and arranged in such a manner that a directly adjacent stator slot is kept at least partially clear when the slot is skipped during winding of the winding pattern having a winding pitch of greater than 1 and the end face disk also having a radially projecting retaining finger between every two adjacent stator slots. The process for installing a winding wire under tension by means of a wire moving means in such a manner that the wire moving means is moved by means of a supporting arm in at least two controlled axes and, if necessary, conveyed through the stator core, the wire moving means rotated about an axis perpendicular to its longitudinal axis for installing the winding wire in the winding wire receiver space of an end face disk, the stator plate rotated forward to a next stator slot to be provided with windings with a corresponding switching pitch, and the winding wire led through an associated retaining finger of the end face disk.

20 Claims, 7 Drawing Sheets

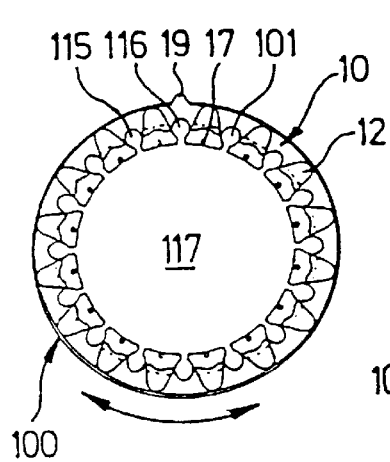
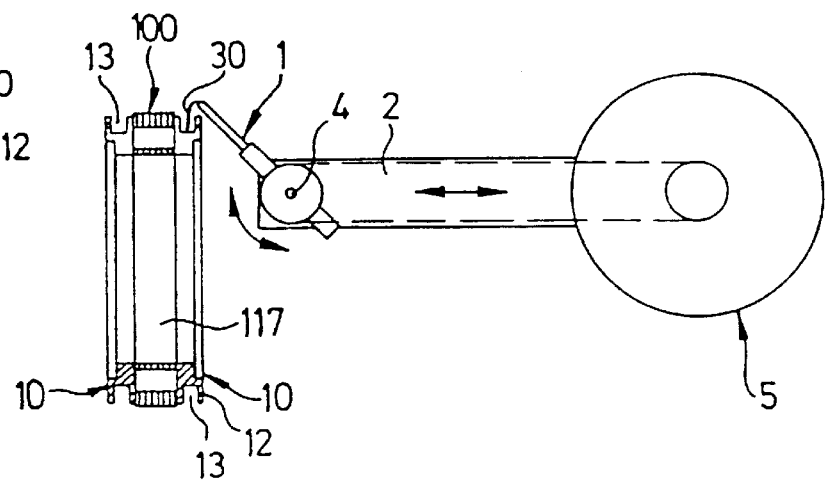
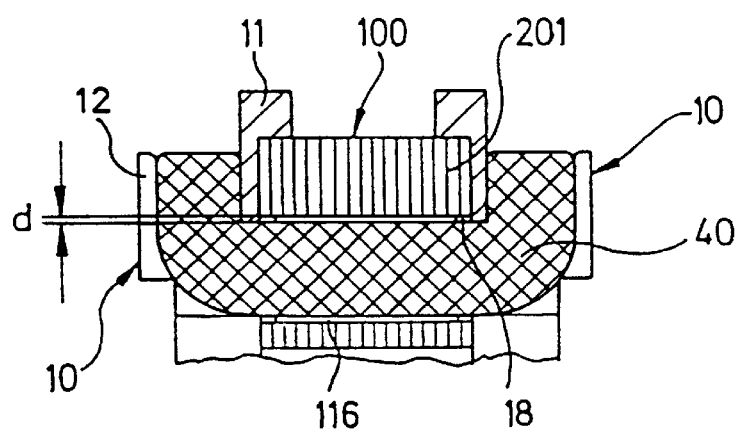

PROCESS FOR PROVIDING A STATOR CORE WITH STATOR WINDINGS

This is a division of application Ser. No. 08/335,081, filed Nov. 7, 1994 now U.S. Pat. No. 5,596,796, the disclosure of which is herein incorporated by reference.

FIELD OF THE INVENTION

The present invention relates to processes of providing a stator core for electric motors with stator windings based on a desired winding pattern.

BACKGROUND OF THE INVENTION

A stator usually includes a stator plate which is bordered with poles in the circumferential direction at regular intervals. An associated stator slot is usually formed between every two adjacent poles in the stator. The stator generally also has an axial through-hole lying in the center, which is denoted as the stator core.

A winding device for stators and/or armatures of electric motors, i.e., components to be provided with windings, which are arranged on a fixed point, is known from the German Patent Number 37 09 687.7 A1 which is hereby incorporated by reference for its teachings on such a winding device. This winding device, for example, teaches a winding, such as a pole winding, provided only around a single pole so that the winding wire is installed in three controlled axes in a freely selective manner. The mounted stator, in the y axis, can execute a rotary movement about its axis. A wire moving means, formed by a winding finger which is held rigidly fixed on a winding needle, for example, in a direction perpendicular to the mounting plane, i.e., in the z axis, is movable. A third axis of movement in a direction perpendicular to the z-y plane, i.e. in the x direction, for example, is made possible by the fact that the mounting means for the stator is mounted on a table arrangement capable of translational movement.

Thus, the winding device discussed in the German patent number 37 09 687.7 A1, due to the three controlled axes of movement, reliably provides a pole winding in the form of a winding in layers only around a single pole up to the base of the stator slot where the x axis is the axis of installation. After the winding is completed on the associated pole, the stator is then moved forward to where the next pole in the direction of rotation is to be wound. As a consequence, this winding device only permits the winding of a stator with a winding pattern having a winding pitch of 1, i.e., each of the poles lying adjacent in the circumferential direction of the stator must be provided with a winding separately in individual winding pitches. Thus, for example, this device can not form a stator having a winding pitch greater than 1 (>1), because when the device skips a pole or adjacent stator slot the cross section of the skipped stator slot would be wound up and closed by the winding wire.

Thus, there is a need for a device or process which may provide a stator for electric motors with a winding pattern which has a winding pitch greater than 1, i.e., that at least one directly adjacent stator slot that is skipped when providing the stator with windings, or the pole lying directly adjacent in the circumferential direction that is skipped when winding.

SUMMARY OF THE INVENTION

The present invention provides such a device or process, i.e., provides a process for winding a stator core for electric machines using a random winding pattern having a winding pitch of greater than 1 in a fully automatic manner. In particular, a wire moving means and an end face disk are used in the process of this invention.

According to the present invention, a process for providing a stator plate having an end face disk mounted on each of two faces of the stator plate with windings with a random winding pattern having a winding pitch greater than 1 where the stator plate is provided with stator slots between poles and a stator core and mounted on a rotary mount for the rotary movement of the stator plate around its axis and where the end face disk is made of an electrically insulating material and forms a winding wire receiver space lying radially and axially outside of the stator slots and running in the circumferential direction and the end face disk has radially projecting retaining fingers between every two adjacent stator slots includes the following steps. Installing a winding wire under tension in a stator slot by using a wire moving means in such a manner that the wire moving means moves by means of a supporting arm in at least two controlled axes and is conveyed through the stator core. Rotating the wire moving means about an axis perpendicular to its longitudinal axis to install the winding wire in the winding wire receiver space of an end face disk. In addition, rotating the stator plate to a next stator slot to be provided with windings based on the corresponding switching pitch by rotating the rotary mount. Also, leading the winding wire through an associated retaining finger of an end face disk.

Thus, in this process according to the present invention, an end face disk made of insulating material is mounted on each of the two axially opposite faces of the stator plate by means of which a winding wire receiver space is formed radially and axially outside of the stator slot such that the winding. As a consequence, a winding can be installed in a first stator slot in the circumferential direction such that the a second adjacent and skipped stator slot skipped is not wound up but is kept at least partially clear so that the second, adjacent, and previously skipped stator slot may still be provided with windings in a subsequent winding pitch.

In addition, to arrange the winding wire in a tight-fitting manner in the circumferential direction in the winding wire receiver space (which is formed by the end face disk), the wire is led (with the shifting forward movement of the stator plate to be provided with windings) by means of AN associated retaining finger where the retaining finger is provided on an end face disk between every two adjacent stator slots and is designed to be radially projecting.

Thus, a stator may be automatically provided with windings having a random winding pattern and a winding pitch greater than 1 (whereby at least one directly adjacent stator slot is skipped during the winding process). As a consequence, stator plates may be universally provided with windings having random winding patterns, each winding pattern according to the desired requirements, without having to reset the stator plate so that the stators may be provided with a random winding pattern in an extremely economical manner.

In order to install the winding wire radially and axially outside of the stator slot in the winding wire receiver space formed by the end face disks, the wire moving means not only executes a translational movement in the axial direction of the stator plate but also executes a rotary movement around an axis perpendicular to its longitudinal axis in a controlled manner preferably via a separate drive, so that the wire moving means has at least two separate, controlled axes of movement. In particularly, an axis of longitudinal movement in the axial direction of the stator plate and an axis of rotary movement perpendicular to the longitudinal axis of the wire moving means.

Due to the configuration of the end face disks, in particular, the winding wire receiver space, and the process of the present invention, at least half of the cross section of the stator slot is kept clear. Thus, a tightly packed winding can be obtained with the smallest possible size of the stator and a corresponding high line density for use as a electric motor.

A preferred embodiment of the process according to the present invention includes the steps of installing the winding wire at a point of contact on a side of one of the end face disks facing away from the stator plate by executing a movement of the wire moving means and running the winding wire past a retaining finger of the end face disk on a side of the retaining finger facing away from the point of contact. In addition, the process includes the steps of pulling the winding wire through one of the stator slots up and slightly out over to the axially opposite end of the other end face disk mounted on the other side of the stator plate such that the wire moving means with the supporting arm is axially conveyed through the stator core and rotating the wire moving means about its axis perpendicular to the longitudinal axis for installing the winding wire in the winding wire receiver space of the end face disk while passing by on the side of the retaining finger of the end face disk facing towards the stator plate and rotating the stator plate with the end face disks around its axis to the next stator slot to be provided with windings according to the winding pattern.

Next, the process performs the steps of returning the wire moving means to a position up and slightly out over to the axially opposite end of the other end face disk mounted on the stator plate and installing the winding wire in the stator slot by executing an axial movement of the supporting arm and of the wire moving means through the stator core for and rotating the wire moving means about its axis perpendicular to the longitudinal axis to install the winding wire in the winding wire receiver space of the end face disk while passing by on the side of the retaining finger facing towards the stator plate and rotating the stator plate about its axis to a next stator slot to be provided with windings according to the winding pattern.

Then the last four steps are repeated until completion of the desired winding pattern on the stator plate, followed by the final step of installing an end of the winding wire at an end point of contact on an end face disk by moving the wire moving means thereby permitting the switching of the stator plate when completely provided with windings.

In this preferred embodiment of the process according to the present invention, not only are the stator windings provided automatically with a winding pitch of greater than 1, but the desired switchings of the stator winding wire is made at the points of contact such as pins, terminals or the like, automatically during the process. The points of contact are provided on sides of the end face disks pointing outward from the stator plate. Thus, using the process of the present invention, additional operations of switching the stator and its windings after the windings have been provided can be omitted. All these winding processes, including the switching of the points of contact are carried out by means of the wire moving means which is automatically moved in a controlled manner in at least two axes of movement in conjunction with the rotary movement of the stator plate around its own axis along with the respective end face disks which are mounted on the stator plate.

According to another aspect of the present inventions a process is provided for providing a stator plate of small dimensions and with a stator core having a small diameter, such as in small motors. This process for providing a stator plate having an end face disk mounted on each of two faces of the stator plate with windings with a random winding pattern having a winding pitch greater than 1 where the stator plate is provided with stator slots between poles and a stator core and mounted on a rotary mount for the rotary movement of the stator plate around its axis and where the end face disk is made of an electrically insulating material and forms a winding wire receiver space lying radially and axially outside of the stator slots and running in the circumferential direction and the end face disk has radially projecting retaining fingers between every two adjacent stator slots includes the step of installing a winding wire under tension in a stator slot by using a wire moving means in such a manner that the wire moving means moves by means of a supporting arm in at least two controlled axes. This process also includes the steps of rotating the wire moving means about an axis perpendicular to its longitudinal axis to install the winding wire in the winding wire receiver space of an end face disk, rotating the stator plate to a next stator slot to be provided with windings based on the corresponding switching pitch by rotating the rotary mount, and leading the winding wire through an associated retaining finger of an end face disk.

In this process, the supporting arm is not moved axially through the stator core during the installation of the winding wire by the wire moving means. Only the wire moving means is moved through the stator core. The wire moving means is correspondingly twisted and rotated on the supporting arm in a predetermined position and then moved through the stator core for installation in the stator slots. This process results in essentially the same advantages as In the previous described processes with the additional feature that this process may be used with stator plates having a stator core with small dimensions. This due, in part, to the fact that the wire moving means is freely rotatable about the axis perpendicular to its longitudinal axis even above winding ranges of 240° and, moreover, that it is freely movable. Thus, the wire moving means can be rotated and moved such that the winding wire can be reliably installed in the winding wire receiver space on the respective end face disk. Even in with compactly designed stator plates, at least half of the cross section of the stator slot is kept clear for subsequent and additional providing with windings due to the winding wire receiver space formed by the end face disk.

A further appropriate variant of this process has the steps of installing the winding wire at a point of contact on a side of one of the end face disks facing away from the stator plate by executing a movement of the wire moving means and running the winding wire past a retaining finger of the end face disk on a side of the retaining finger facing away from the point of contact. These steps are followed by the steps of pulling the winding wire through one of the stator slots up and slightly out over to the axially opposite end of the other end face disk mounted on the other side of the stator plate such that the wire moving means is moved axially through the stator core and rotating the wire moving means about its axis perpendicular to the longitudinal axis for installing the winding wire in the winding wire receiver space of the end face disk while passing by on the side of the retaining finger of the end face disk facing towards the stator plate and rotating the stator plate with the end face disks around its axis to the next stator slot to be provided with windings according to the winding pattern.

In addition, the process includes the steps of returning the wire moving means to a position up and slightly out over to the axially opposite end of the other end face disk mounted on the stator plate and installing the winding wire in the stator slot by executing an axial movement of the wire moving means through the stator core for and rotating the wire moving means about its axis perpendicular to the longitudinal axis to install the winding wire in the winding wire receiver space of the end face disk while passing by on the side of the retaining finger facing towards the stator plate and rotating the stator plate about its axis to a next stator slot to be provided with windings according to the winding pattern.

Finally, the last four steps are repeated until completion of the desired winding pattern on the stator plate, and then a final step of installing an end of the winding wire at an end point of contact on an end face disk by moving the wire moving means thereby permitting the switching of the stator plate when completely provided with windings is performed. In this preferred process, the winding wire is also installed in the same manner around points of contact for the desired switching of the stator at the beginning of winding and at the end of winding, so that a fully automatic winding and switching of the stator with random and variable winding pitches can be achieved in order to guarantee, even in small motors, a winding that can be executed economically and effectively with industrial adaptation to the desired winding pattern in each case. A preferred embodiment of a wire moving means for providing a stator plate, provided with stator slots and a stator core, with windings by use of machines for electric machines or electric motors with a random winding pattern having a winding pitch of greater than 1, i.e., while skipping at least one directly adjacent stator slot, which is especially intended for carrying out the process described first, the wire moving means can be moved by means of a supporting arm in a controllably driven manner in two or three axes while passing through the stator core, and that the wire moving means is rotatably mounted on one end of the supporting arm around an axis perpendicular to its longitudinal axis.

By means of this fundamental design of the wire moving means according to the present invention, the winding wire can be fully automatically installed according to the desired winding pattern having a winding pitch of greater than 1 on the stator plate with the end face disks mounted on its two faces. Compared to the wire moving means designed as a winding finger and the winding needle according to DE 37 09 687 A1, the fact that the wire moving means is additionally rotatable or pivotable around an axis perpendicular to its longitudinal axis, so that the winding wire can be installed in the winding wire receiver space of the end face disks, in a predetermined manner, radially and axially outside of the stator slot, is especially fundamental in this execution of the wire moving means.

Further, a variant of a wire moving means is provided for providing a stator plate, having stator slots and a stator core, with windings by use of machines for electric machines or electric motors, the variant is especially intended for carrying out the process for providing stators with windings for small motors. This wire moving means can be moved in a controllably driven manner by means of a supporting arm in two or three axes, and it is mounted on one end of the supporting arm about an axis perpendicular to its longitudinal axis, namely, such that the wire moving means can be rotated about winding ranges of 240° and greater, and the free end of the wire moving means is designed in the shape of a hook, such that the winding wire can be reliably installed in the winding wire receiver space on the end face disk by means of the retaining linger reaching above and behind the end face disk.

The rotary drive means for the rotary movement of the wire moving means around the axis perpendicular to its longitudinal axis is preferably mounted on the supporting arm of the wire moving means. For example, a belt drive or a chain drive or a sliding gear drive may be used to facilitate the movement. To move the wire moving means in its respective positions, in particular, the corresponding necessary positions of rotation, a blocking cylinder may be employed to cooperate with the wire moving means. The blocking cylinder being capable of stopping the moving means at a particular position of rotation. Preferably the wire moving means is rotatably mounted on one end of the supporting arm and the rotary drive means provided on the other end of the supporting arm. Thereby creating an balanced arrangement on the supporting arm.

Further, according to the present invention, the end face disk is made of an electrically insulating material for mounting on a side of stator plate to facilitate a process of installing windings with a random winding pattern having a winding pitch of greater than 1 on the stator plate where the stator plate has stator slots and a stator core and the end face disk includes a circumferential edge flange which when mounted on the stator plate covers the front surface of the stator plate and insulates the winding to be installed on the stator and a retaining finger arranged between every two adjacent stator slots of the stator plate and running radially on the end face disk. The end face disk also includes a winding wire receiver space lying radially and axially outside of the stator slots, the receiver space formed between the circumferential edge flange and the retaining fingers and having a depth such that the stator slots are kept at least partially clear when windings are installed on the stator plate.

The end face disk is produced as a separate component from the actual stator plate and the end face disk is mounted on the respective front surfaces of the stator plate before providing the windings. A positive connection with the stator slots is preferably provided. The winding wire receiver space formed by the end face disk makes it possible to install the winding wire along the circumference of the stator plate up to the next stator slot to be provided with windings according to the winding pattern and axially outside of the stator slot such that a stator slot skipped during a winding due to the winding pattern remains at least 50% clear in its cross section, calculated from the base of the stator slot.

Preferably, the end face disk has a collar running axially about the end face and projecting at least partially into the respective stator slot when mounted on a stator plate to form a spacer for insulation against the stator plate. It is also preferably that the collar is configured to lock into stator slots of a stator disk when the end face disk is mounted on the stator plate.

In addition, preferably, the end face disk has another essential feature, a point of contact for a starting or ending position for a winding wire to be wound on the end face disk. With such a feature, the end face disk may be used for the switching the windings installed on the stator plate. The point of contact is formed by one of a pin or terminal.

Finally, in the preferred embodiment of the invention, the end face disk has at least one removable radially projecting indexing tab on the circumferential edge flange of end face disk for the determination. The indexing tab is used to determine the starting position for the control of the winding processes. By means of this indexing tab and with the use of a suitable program control, the winding processes can be carried out automatically with regard to the movement controls of the wire moving means and the rotary movement of the stator around its axis. If necessary, appropriate reading means can be provided, so that a learning or operational program control can be used where the program can record and then read the number of stator slots and additional parameters of the stator in a learning step before processing the winding pitch.

It is evident that the end face disk is essential in the process according to the present invention, not only functionally essential for carrying out the winding processes on the stator plate, but for combining several functions in itself. In particular, the functions of insulating the winding from the stator plate, accommodating the points of contact and providing an indexing means for determining and carrying out the windings automatically. The indexing tab, which is preferably provided on the end face disk, may be removed after the stator has been provided with windings.

In summary, with the use of the wire moving means (which may be controlled on multiple axes) and with the use of the end face disk on each of the front surfaces of the stator plate, a surprisingly economical, extremely advantageous, process for providing a stator with windings for electric machines or electric motors with a random winding pattern having a winding pitch of greater than 1 is achieved according to the present invention. By means of this process, stator plates of various dimensions and designs may be universally provided with windings with the respective desired winding patterns having a winding pitch of greater than 1. Of course, even two or more wire moving means can be used for providing the same stator with windings according to the specified processes.

BRIEF DESCRIPTION OF THE DRAWINGS

The present invention is explained in detail below by reference to the attached drawings. In the drawings:

FIG. 2b is a cross section taken along line 2b—2b of FIG. 2a;

FIG. 2c is an enlarged view of detail 2c of FIG. 2a;

FIG. 5a is a top view of the stator plate as shown in FIGS. 2a–2f and depicts the rotation of the stator plate to another stator slot to be wound;

FIG. 5b is a lateral view depicting the installation of the winding wire in the stator slots and the winding wire receiver space of the stator plate shown in FIGS. 2a–2f with the wire moving means depicted in FIGS. 1a–1b;

FIG. 6 is an axial sectional view of a winding on the stator plate mounted with the end face disks on each face;

FIG. 7b is a top view depicting a second component of the winding pattern shown in FIG. 7a;

FIG. 7c is a top view depicting a third component of the winding pattern shown in FIG. 7a;

FIG. 7d is a top view depicting a fourth component of the winding pattern shown in FIG. 7a;

DETAILED DESCRIPTION OF PREFERRED EMBODIMENTS

Figure 1A:
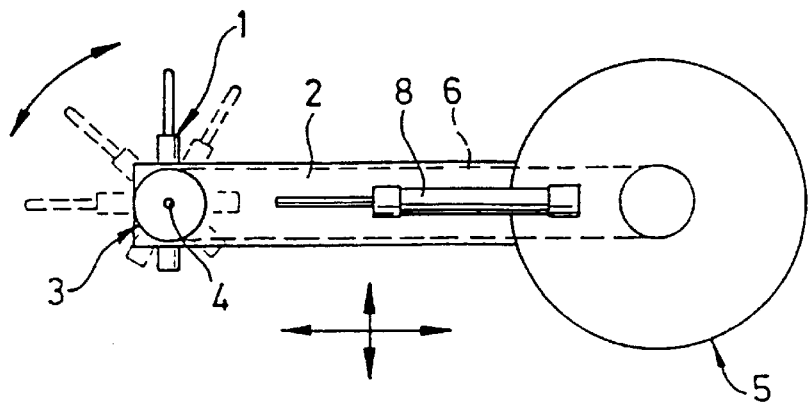
FIGS. 1a and 1b are a lateral view and a top view, respectively, of a preferred embodiment of a wire moving means for use in the winding process according to the present invention.
Figure 1B:
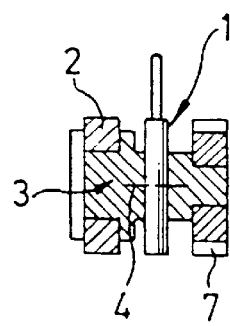

In the Figures, the same or similar components are provided with the same reference numbers to improve clarity. A first preferred embodiment of a wire moving means 1 according to the present invention is explained by reference to FIGS. 1a and 1b. The wire moving means 1 is rotatably mounted around an axis of rotation designated as 4 (as indicated by arrows) on a supporting arm 2 by means of a pivot bearing 3 where the axis of rotation 4 is perpendicular to the longitudinal direction or the longitudinal axis of the wire moving means 1. The wire moving means 1 can be designed as a wire nozzle through whose interior a winding wire to be installed travels (which is not shown in detail) where the winding wire is taken from an appropriate storage means under a certain primary tension.

A rotary drive means 5 is provided for producing rotary movement of the wire moving means 1 around the axis of rotation 4 on the supporting arm 2. The rotary drive means 5 is mounted in the vicinity of an end of the supporting arm 2 opposite the axis of rotation 4. The drive movement produced by the rotary means 5 is transferred to a pinion 7 by means of a chain drive or belt drive 6 or, if necessary, a sliding gear drive (not shown) so that the wire moving means 1 carries out a rotary movement or a pivoting movement in the directions indicated with by arrows around the axis of rotation 4 in a controlled manner.

The supporting arm 2 together with the wire moving means 1 rotatably mounted there is movably arranged (as schematically indicated by arrows in FIG. 1) on a suitable winding device in at least one and preferably another direction of movement which is preferably perpendicular to the first direction of movement, as is indicated, for example, in German Patent Number 37 09 687.7 A1 in relationship to the winding needle and winding finger shown in the German patent. The specific details with regard to the movement arrangement for the supporting arm 2 and the wire moving means is beyond the scope of this invention.

The first preferred embodiment of the invention also includes a blocking cylinder 8, which can be actuated hydraulically, pneumatically or electromagnetically as well as a combination hereof. The blocking cylinder is coupled to the wire moving means 1 so that the wire moving means 1 can be secured and stopped in a desired position. This permits the wire moving means 1 to be more reliably positioned given possible wire moving forces and back-pull from the winding wire.

Referring briefly to FIG. 7, stator slots 101 to 116 are arranged at regular intervals in the circumferential direction in connection with an end face disk and an stator plate of an stator body. The stator slots 101 to 116 are conventionally pointing open in the direction radial to the central axis of the stator. Below however, in connection with the describing the essential course of the process according to the present invention, only some of the stator slots 101 to 116 are shown for reasons of clarity. In particular, only a segment of the slots are shown below in order to illustrate a winding pattern having a winding pitch of greater than 1 generated using steps of a process according to the present invention.

Referring to FIGS. 2a to 2f, a preferred embodiment of an end face disk 10 according to the present invention is shown and explained as a detail. The end face disk 10 is made of an electrically insulating material, preferably a plastic material. The end face disk 10 is configured to be adapted to a stator plate 100 which is to be provided with windings where the stator plate 100 has stator slots 101 to 116 distributed at regular intervals over the circumference and an axial continuous stator core 117.

The end face disk 10 according to the present invention has a circumferential edge flange 11 which covers the front surface of the respective stator plate 100 when mounted thereon and insulates the windings to be provided. The end face disk also has retaining fingers 12 arranged axially at a distance so as to be located between every two adjacent stator slots 101 to 116 of the stator when mounted thereon.

The retaining fingers 12 project radially and run approximately parallel to the circumferential edge flange 11 of the end face disk 10. A winding wire receiver space 13 is formed between the axially distanced circumferential edge flange 11 and the retaining fingers 12 distributed over the circumference where the space 13 lies radially and axially outside of the stator slots 101 to 116 relative to the stator plate 100 when the end face disk 10 is mounted thereon.

Figure 2A:
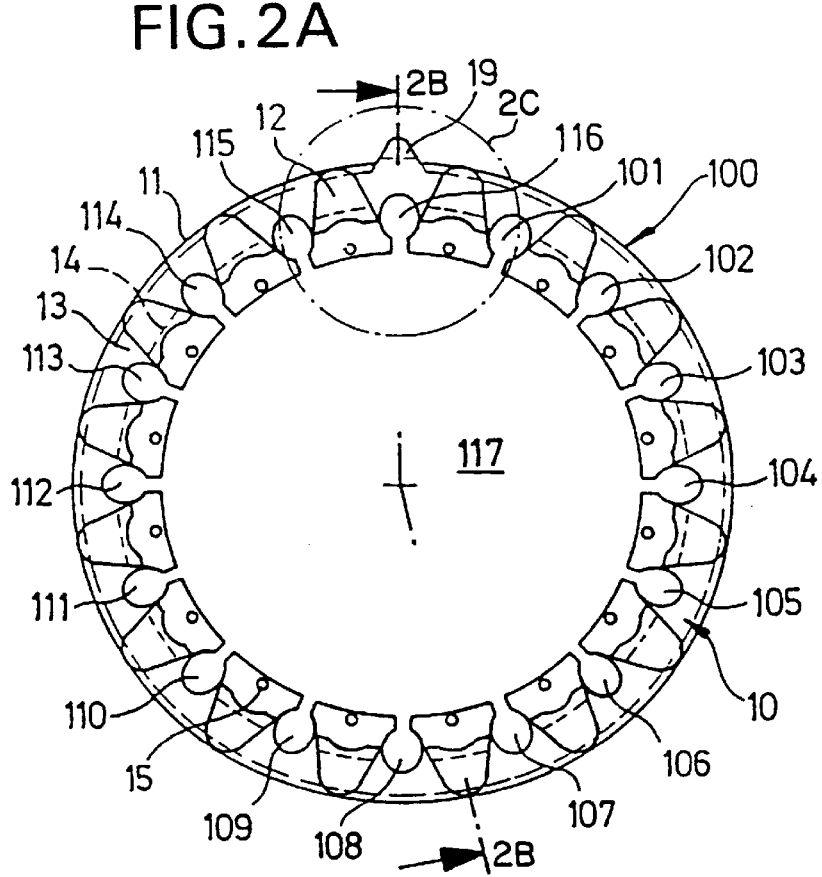
FIG. 2a is an end view of an end face disk according to a preferred embodiment of this invention.
Figure 2B:
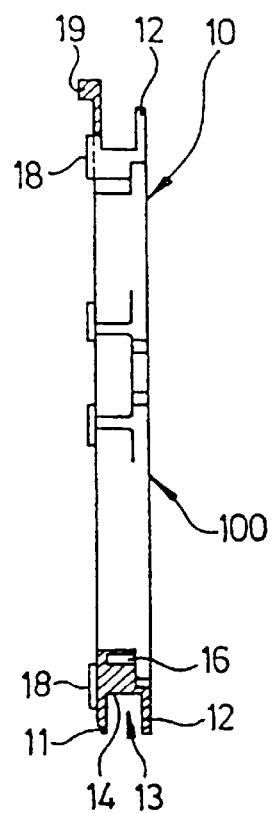
Figure 2C:
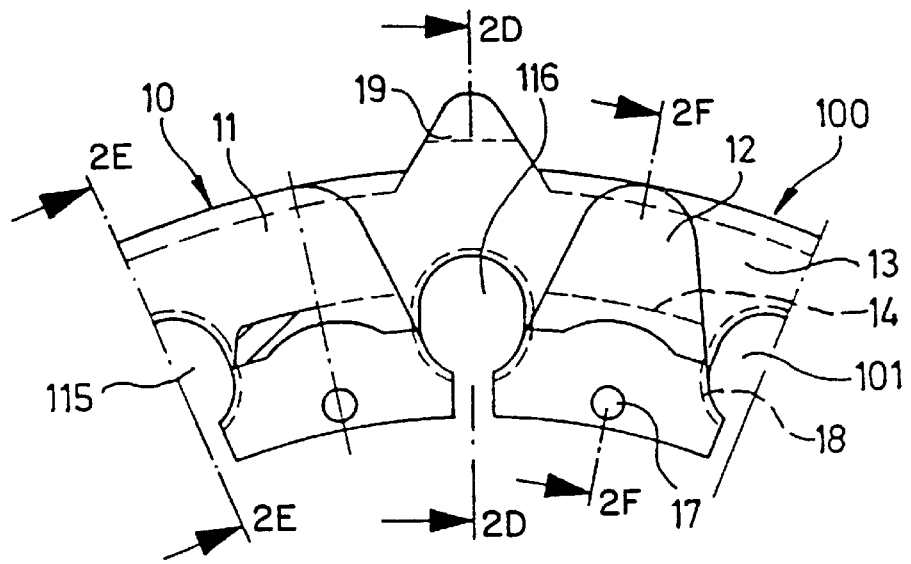
Figure 2D:
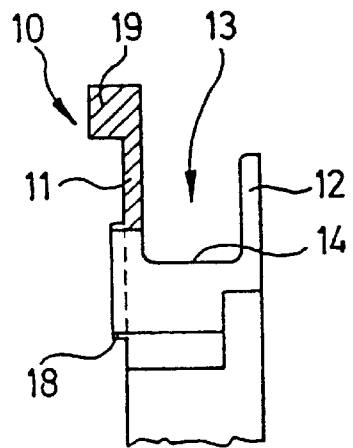
FIG. 2d is a cross section taken along line 2d—2d of FIG. 2c.
Figure 2E:
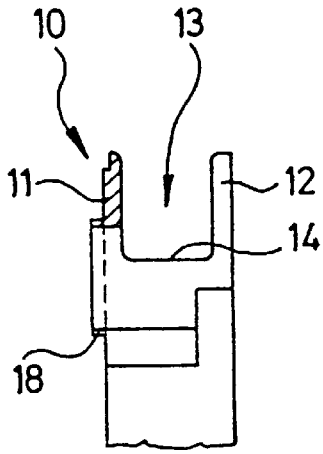
FIG. 2e is a cross section taken along line 2e—2e of FIG. 2c.
Figure 2F:
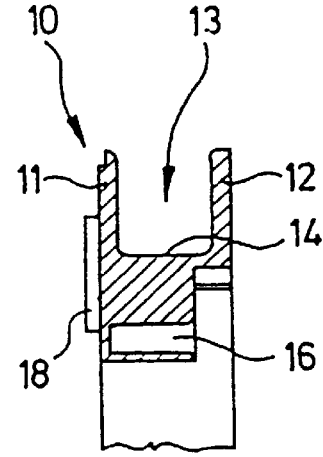
FIG. 2f is a cross section taken along line 2f—2f of FIG. 2c.

The winding wire receiver space 13 of the present invention is configured to have a depth so that the associated stator slots 101 to 116 are kept at least partially clear (up to about 50% for example) in their cross section. This is evident from the FIG. 2b which shows that the bottom 14 of the winding wire receiver space 13, which runs as an extension of the axial direction of the stator plate 100, lies in the radial direction of the stator plate 100 only slightly above the base of the stator slots 101 to 116. For example, a stator plate 100 with stator slots 101 to 116 is shown in FIG. 2a and FIG. 2c in broken lines in association with the end face disks 10. Further, the configuration of the winding wire receiver space 13 is also evident from FIGS. 3b and 6 which are explained in detail below.

The end face disk 10 also has points of contact 15 (shown in FIG. 7). There is a separate point of contact 15 associated with each retaining finger 12 and a receiver opening 16 is provided, in which a pin 17 may be inserted to function as a point of contact for the beginning of a winding wire. See, for example, FIG. 3b which is described in detail below. Of course, as necessary, other embodiments of points of contact 15 may also be provided, in which case, for example, they may be in the form of terminals or the like. The points of contact are radially exposed on the outside, thereby accessible to the end face disk 10, i.e., they are provided on the retaining finger 12 on the side facing away from the stator plate 100. The points of contact 15 are preferably only provided on one of the two end face disks 10 mounted on the stator plate 100.

In the area of the circumferential edge flange 11 on the side facing towards the face of the stator plate 100, each end face disk 10 also has an insulating collar 18, which, as is shown in FIG. 6, for example, engages in an interlocking manner in the associated stator slots 101 to 116. The insulating collar 18 projects partially into the stator slots 101 to 116 and thus insulates (as is shown in FIG. 6, for example) windings 40 provided from the stator plate 100. In addition at the same time, the insulating collar 18 causes the windings 40 to be formed at a predetermined distance from each respective stator slot 101 to 116.

As also shown in FIGS. 2a, 2b, 2c, and 2d, at least one indexing tab 19 is provided on the circumferential edge flange 11 of the end face disk 10. The indexing tab 19 covers the front surface of the stator plate 100 and is designed to project radially. The indexing tab 19 is used in the present invention to determine the starting position for the control of the winding processes and, thus may be removed after the winding process is complete, i.e., after the stator plate 100 has been provided with windings. The position of the indexing tab 19 is selected based on the position of the end face disk 10 when mounted on the front surface of the stator plate 100.

A first preferred process of providing a stator plate with windings according to the present invention is described in detail below by reference of FIGS. 3 to 6. In particular, the process is for providing windings on a stator plate 100 having with stator slots 101 to 116 between poles 201 to 215, a stator core 117, and an end face disk 10 made of an electrically insulating material is mounted thereon. The stator plate 100 configuration is mounted on a rotary mount which provided for rotary movement of the stator plate around its axis.

The rotatory mount and the wire moving means 1 are used in a process according to the present invention which provides the stator 100 with windings via a random winding pattern, the pattern having a winding pitch of greater than 1, i.e., while skipping at least one directly adjacent stator slot on both faces of the stator plate 100 when placing wire in the wire receiver space 13. In the preferred embodiment of the invention, as noted above, the wire receiver space 13 lies radially and axially outside of the stator slots 101 to 116 and runs in the circumferential direction with at least one directly adjacent stator slot 101 to 116 where the slots are kept at least partially clear. The wire receiver space 13 also has a radially projecting retaining finger 12 between every two adjacent stator slots 101 to 116.

According to the first preferred process of the present invention, in order to provide windings, a winding wire 30, under tension by means of the wire moving means 1, is installed in such a manner that the wire moving means 1 moves in at least two controlled axes by means of the supporting arm 2 and is conveyed through the stator core 117. In this process, the wire moving means 1 is rotated about the axis 4 which is perpendicular to its longitudinal axis in order to install or place the winding wire 30 in the winding wire receiver space 13 of the respective end face disk 10. Next, the stator plate 100 is rotated to the next stator slot 101 to 116 to be provided with windings by the rotary mount (not shown) according to the corresponding or selected switching pitch. Then, the winding wire 30 is led through the corresponding retaining finger 12 of the end face disk 10.

A preferred embodiment of this process, divided into individual winding pitches, is explained in detail by reference to FIGS. 3a to 6. The preferred process has eight steps, steps a) to h). As an example, a completed stator slot provided with windings is shown in an axially sectional view in FIG. 6. Steps a) and b) of the process are described in detail by reference to FIGS. 3a and 3b.

Figures 3A, 3B:
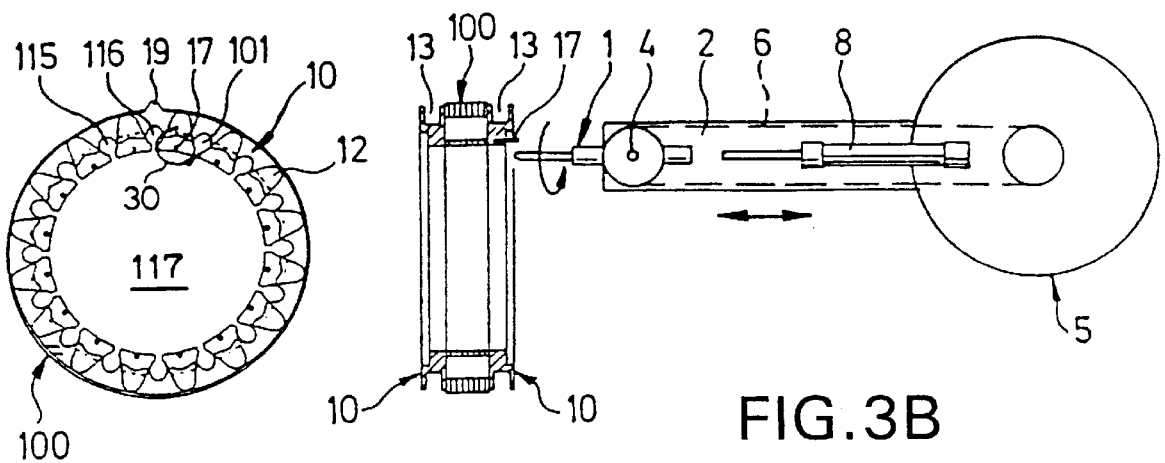
FIG. 3a is a top view of the stator plate and end face disk as shown in FIGS. 2a–2f depicting a winding wire installed at a point of contact and drawn past a side of a retaining finger.
FIG. 3b is a lateral view depicting the installation of the winding wire at a point of contact as shown in FIG. 3a with the wire moving means as shown in FIGS. 1a and 1b.
Figures 3C, 3D:
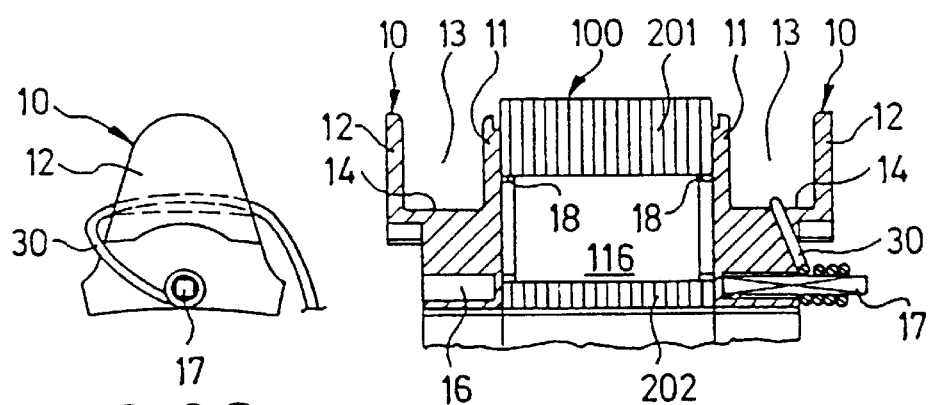
FIG. 3c is an enlarged view of one component of the stator plate and the end face disk shown in FIG. 3a and depicts a winding wire installed at a point of contact and drawn past a side of a retaining finger.
FIG. 3d is an enlarged fragmentary cross-sectional view of the stator plate and end face disk as shown in FIG. 3a and depicts a winding wire installed at a point of contact and drawn past a side of a retaining finger.

In step a), shown in FIG. 3a, the winding wire 30 is installed at a point of contact 15 (pin 17) of the end face disk 10 and is wound around same, for example to secure the beginning of the winding wire 30 to the point of contact. As noted above, the point of contact 15 (pin 17) lies on the side of the end face disk 10 facing away from the stator plate 100. In this step, step a), of the process, the wire moving means 1 is rotated about its longitudinal axis (for example, as is indicated with an arrow in FIG. 3a) in order to cause the winding wire 30 to wrap or form several windings about the pin 17 (which is a start pin). After the installation of the winding wire 30 on the point of contact 15 or the winding about the pin 17, then step b) is performed.

In step b), the winding wire 30 is then led around the retaining finger 12 associated with the pin 17 into the receiver space formed by the retaining finger 12 in the end face disk 10. Thus, in step b), the winding wire 30 is installed in the winding wire receiver space 13 as shown in the left view of the two views shown in FIG. 3. In particular, the wire is led to the first slot 101. As also part of step b), the winding wire 30 is then pulled through slightly out and above the first slot 101 by rotating the wire moving means 1 above and moving the supporting arm 2 away from the stator plate 100, i.e., through the stator slot 101 up to the axially opposite end of stator plate 100 with mounted end face disk 10.

Figure 4A:
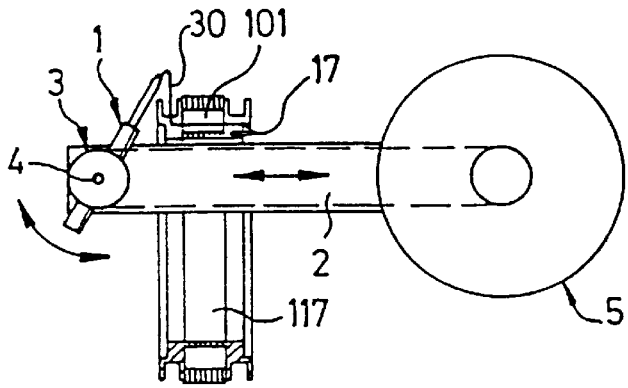
FIG. 4a is a lateral view of the installation of a winding wire in a winding wire receiver space of the stator plate shown in FIGS. 2a–2f with the wire moving means depicted in FIGS. 1a–1b.
Figure 4B:
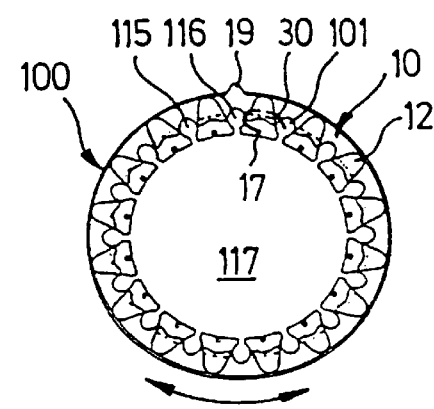
FIG. 4b is a top view of the stator plate depicted in FIGS. 2a–2f and depicts the running of the winding wire past one of the retaining fingers to a stator slot.
Figure 7A:
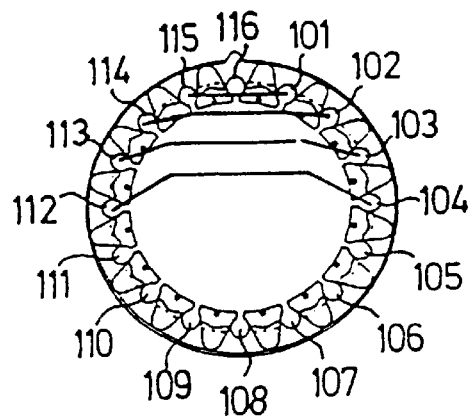
FIG. 7a is a top view depicting one component of one type of winding pattern with a winding pitch greater than one that may be formed with the wire moving means shown in FIGS. 1a–1b and the stator plate shown in FIGS. 2a–2f.
Figure 7B:
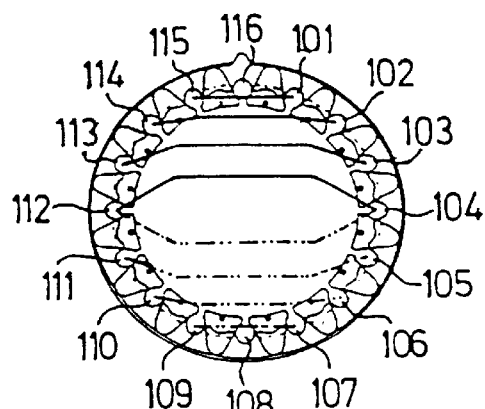
Figure 7C:
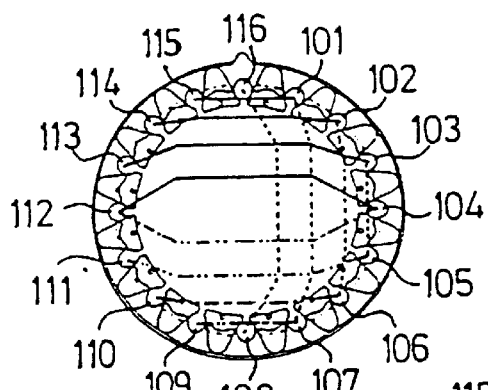
Figure 7D:
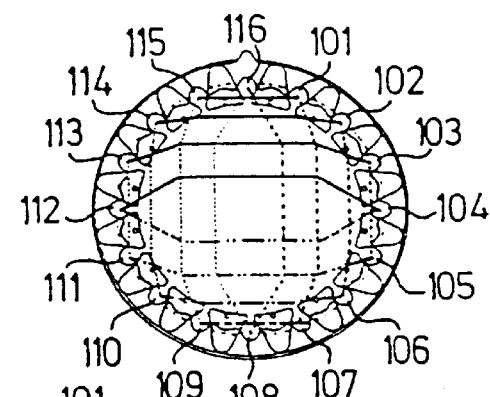
Figure 7E:
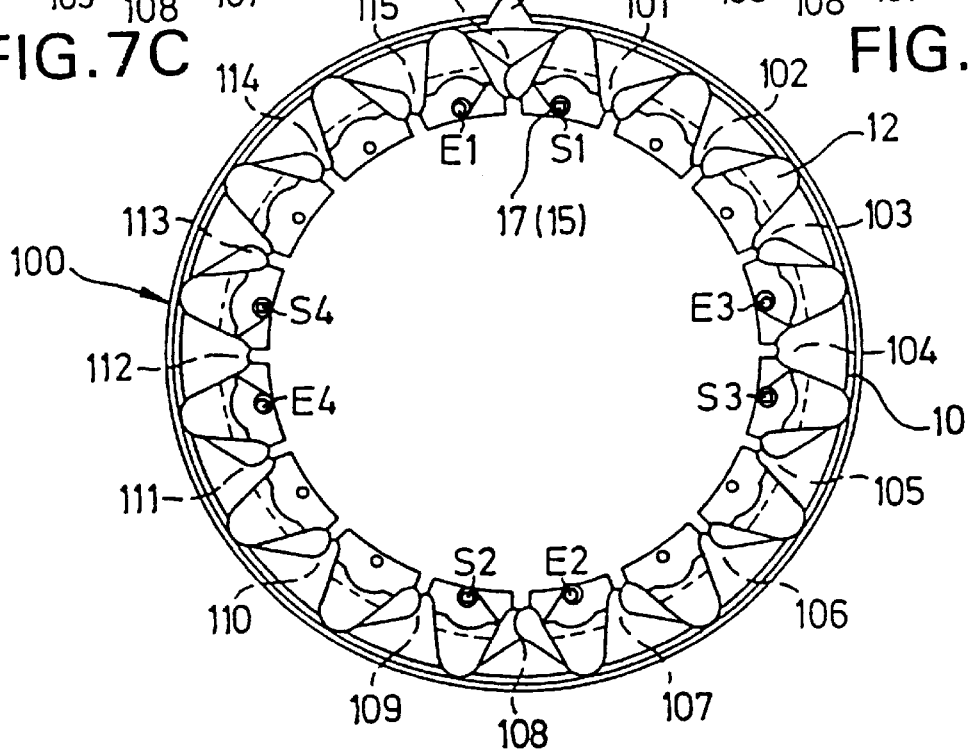
FIG. 7e is a top view depicting the starting points and the ending points for the winding pattern shown in FIGS. 7a–7d.
Figure 8:
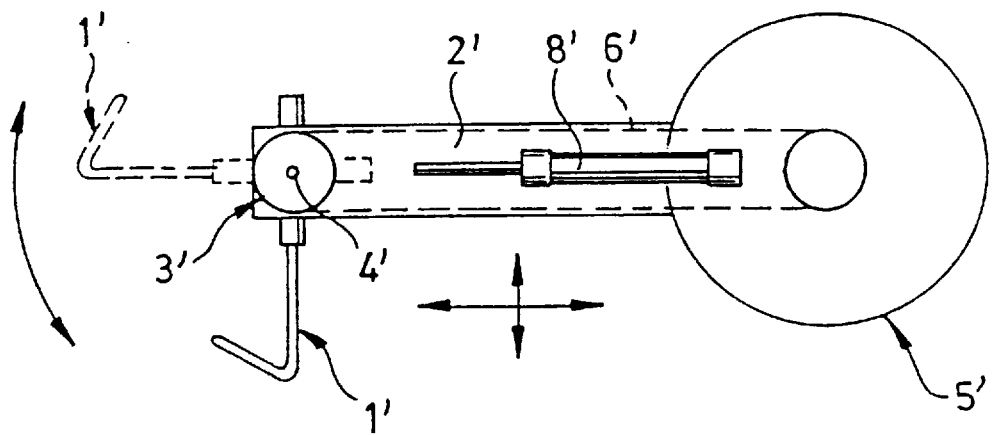
FIG. 8 is a lateral view of another preferred embodiment of a wire moving means for use in the winding process according to the present invention where the embodiment is especially intended for small motors, i.e., stators having small dimensions.

In step c) of this preferred embodiment of the invention, the wire moving means 1 with the supporting arm 2 is moved in the axial direction through the stator core 117 as shown in the left view of the two views of FIG. 4. In addition, as also shown in FIG. 4, the wire moving means 1 is rotated or pivoted about its axis 4 perpendicular to the longitudinal axis. Thus, in this step, the winding wire 30 is placed in the winding wire receiver space 13 formed by the end face disk 10 on the opposite side of the stator plate 100.

In step d), performed at the same time the wire moving means 1 is being rotated about its axis 4, the stator 100 and mounted end face disks 10 are rotated about their axis as shown in the right view of the two views shown in FIG. 4. Thus, in step d), the winding wire 30 in passes on the side of the retaining finger 12 of the end face disk 10 facing towards the stator plate 100 to the next stator slot to be provided with windings according to the winding pattern, which is formed by the stator slot 115 in the example shown in FIG. 4. This winding process represents a winding pitch of greater than 1, since the stator slot 116 lying directly adjacent to the slot 101 in the circumferential direction is skipped, i.e., stator slot 115 is the next slot to be provided with windings after stator slot 101.

As noted above and as evident from FIG. 3b, the winding wire receiver space 13 formed by the end face disk 10 lies radially and axially outside of the stator slots 101 to 116 and the bottom 14 of the winding wire receiver Space 13 lies as far outside as possible, so that the associated stator slots 101 to 116 are kept as clear as possible, for example, when the stator slot 116 was skipped in the above-described process, i.e., steps a) to d).

The remaining process steps, e) and f), are explained in detail by reference to FIG. 5. In step e), the wire moving means 1 is returned thought the stator core 117 by moving the supporting arm 2 axially through the stator core 117. As a consequence, winding wire 30 is installed, for example, in the stator slot 115. In this case, the wire moving means 1 is moved slightly out and above stator slot 115 to the axially opposite end of the stator plate 100 and the mounted end face disk 10. Then, the wire moving means 1 is rotated or pivoted about its axis 4 perpendicular to the longitudinal axis by means of the rotary drive means 5 so that the winding wire 30 is placed and installed in the winding wire receiver space 13 formed by the end face disk 10 while passing by on the sides of the retaining finger 12 facing towards the stator plate 100.

Then, in step f), as shown in the left view of the two views of FIG. 5, the stator or the stator plate 100 is rotated about its axis to the next associated stator slot 101 to 116 to be provided with windings. In a further process step g), steps c) to f) are repeated, until the desired winding pattern is completed on the stator plate 100 with a winding pitch of greater than 1. Finally, in the last step, step h), which is similar to step a), the end of the winding wire 30 is installed and mounted at an end point of contact (for example, an end pin 17). In particular, the wire moving means 1 is moved in the same corresponding manner.

By the above described process, the stator or stator plate 100 may be provided with windings that are switched. By completing process steps a) to h), a stator may be completely provided with windings with the desired winding pattern, and it is switched at the same time. Then, if desired, the indexing tab 19 of the end face disk 10 may be removed, and the stator 100 provided with windings can be used in accordance with specifications in an electric machine or in an electric motor.

A single stator slot of the stator plate 100 that has been provided with windings via the above mentioned process is illustrated in FIG. 6. The overall winding from the process according to the present invention is designated as 40 as a whole. As is evident from the Figure, the winding 40 is installed radially and axially outside of the stator slot 101 to 116 in the winding wire receiver space 13 formed by two end face disks 10. As noted above, the insulating collars 18 on the end face disks 10 serve as spacers between the associated stator slots 101 to 116 so that the winding 40 is sufficiently insulated against the stator plate 100, by an intermediate space, distance d as shown in FIG. 6.

Because the winding wire 30 of the winding 40 is installed radially and axially outside in the winding wire receiver space 13 of the end face disks 10, when a next adjacent stator slot 101 to 116 to be provided with windings is skipped during the winding process (pitch>1), this skipped is kept clear in its cross section and thus may then be provided with windings in a generally unhindered manner in a later winding pitch, i.e., when the winding is switched. Thus, the winding process according to the present invention may generate random winding patterns with a winding pitch of greater than 1 automatically.

For example, a winding pattern for a two-pole stator is illustrated in FIG. 7. The winding sequence includes providing windings I to IV, which each has a different characterization and a winding pitch greater than 1. In the first winding, winding I, shown in FIG. 7, using the process of the present invention, the stator slots 101 and 115, the stator slots 102 and 114, the stator slots 103 and 113, and the stator slots 104 and 112 are provided with windings (see the traced line for the first winding I). The second winding, winding II, which is shown by a broken line with two dots in FIG. 7, using the process of the present invention, the stator slots 104 and 112, the stator slots 105 and 111, the stator slots 106 and 110, and the stator slots 107 and 109 are provided with windings.

The third winding, winding III, which is shown by a dotted line in FIG. 7, includes providing the stator slots 108 and 116, the stator slots 107 and 101, the stator slots 106 and 102, and the stator slots 105 and 103 with windings. The fourth winding, winding IV, which is shown by a dotted line in FIG. 7, includes providing the stator slots 103 and 105, the stator slots 102 and 106, the stator slots 101 and 107, and the stator slots 116 and 108 with windings. The windings provided in this example were associated with a start pins S and end pins E of the stator plate 100, by means of which and at the same time using the process of the present invention, the stator may be provided with windings which are switched. The start pins and end pins are designated as S1 and E1, S2 and E2, S3 and E3, and as S4 and E4, in FIG. 7. They are associated with the windings I to IV, respectively, in the winding sequence.

Another preferred process of the present invention is described by reference to FIGS. 8 to 11. This preferred process is intended for providing winding for stators having small dimensions, such as stators for small motors. The same or similar parts of the this embodiment are provided with the same reference numerals used in the description of the first preferred embodiment except that the reference numerals used in this embodiment are followed by a "'" to distinguish them from the previously explained process. This is also true for the corresponding process steps. Even if a process step or design detail is the same as in the previously described process, the process or detail shall not be described in detail below. Thus, only the essential differences and deviations between the two preferred embodiments of the invention will be discussed in detail.

Figure 9:
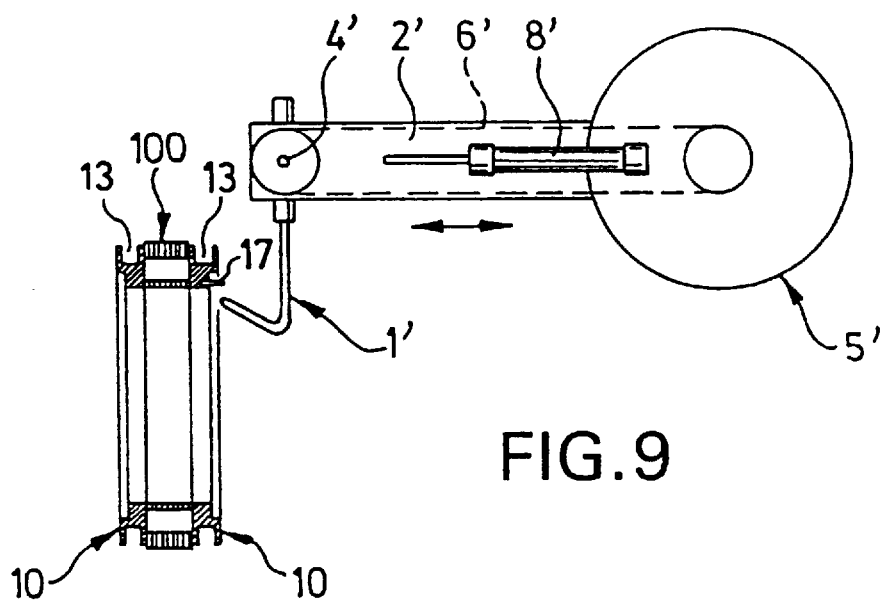
FIG. 9 is a lateral view of a winding pitch using the preferred embodiment shown in FIG. 8 where the pitch makes a shift at the beginning of the winding wire where the beginning of the winding wire has a point of contact formed by a pin before the stator plate is actually provided with windings.

In particular, from a design point of view, the wire moving means 1' in this embodiment differs only in that it is designed in the shape of a hook on its free end. As is shown in FIG. 9, the wire moving means 1' is rotated in a corresponding manner about the axis of rotation on the supporting arm 2' and moves in a predetermined manner by means of the supporting arm 2', such that, for example, the beginning of the winding wire can be wound about a point of contact, such as a pin 17. Therefore, FIG. 9 illustrates that process steps a') and b') are similar to the process steps a) and b) described with reference to FIG. 3a. Thus, in steps a') and b'), the winding wire 30 is installed at a point of contact 15 by means of the wire moving means 1', and passed behind the retaining finger 12 of the end face disk on a side facing away from the point of contact 15. In the example shown, the point of contact has a pin 17.

Figure 10:
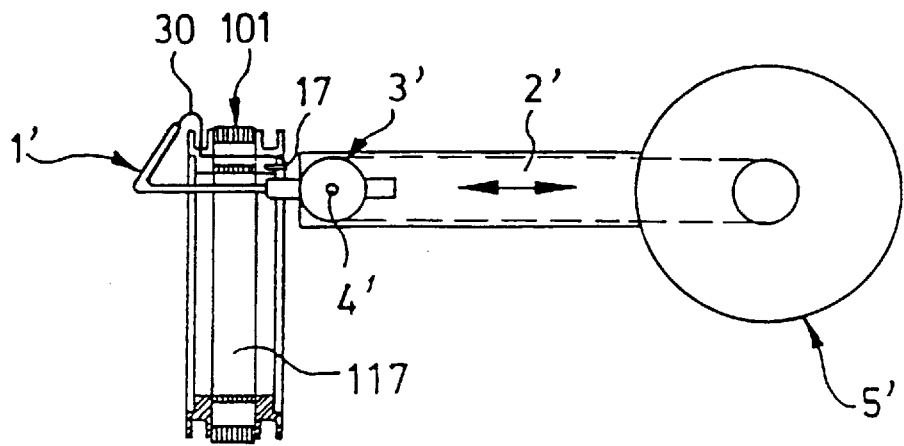
FIG. 10 is a view of another winding pitch, using the preferred embodiment shown in FIG. 8, illustrating the configuration of the wire moving means after providing a stator slot with windings during the process of installing wire in a winding wire receiver space of an associated end face disk mounted on a stator.

FIG. 10 is used to described process step c') where step c') which performs the same function as step c) described above but in a different manner. In particular, as shown in FIG. 10, the wire moving means 1' is now moved through the stator core 117, not the supporting arm 2'. Upon the completion of step c'), the winding wire 30 is then placed in the wire receiver space 13 directly by the wire moving means 1' which is designed in the shape of a hook on its free end without the supporting arm 2' being moved axially through the stator cord 117.

Figure 11:
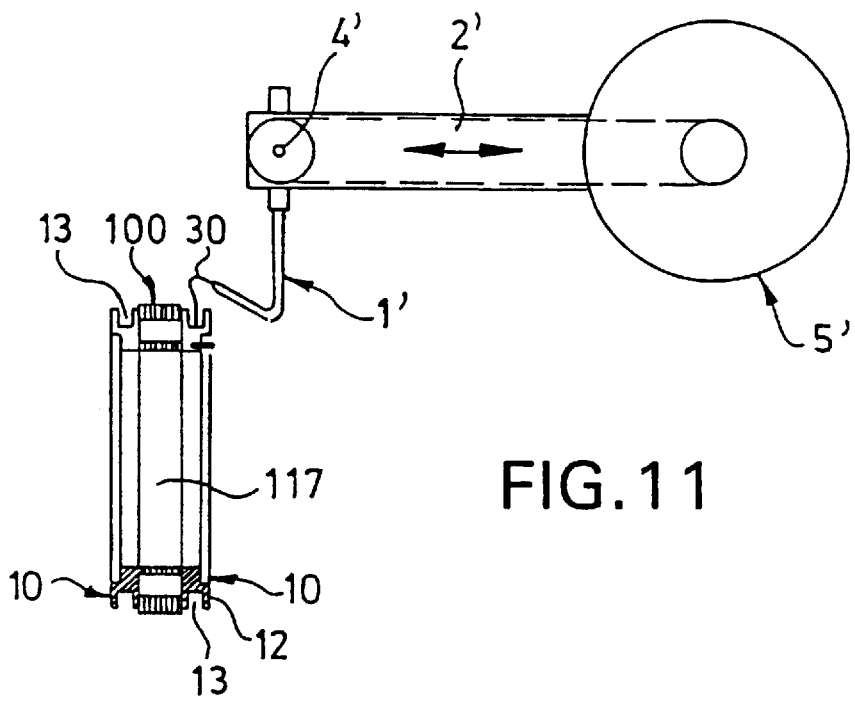
FIG. 11 is a view of another winding pitch, using the preferred embodiment shown in FIG. 8, illustrating the configuration of the wire moving means after the winding wire is installed in a winding wire receiver space formed by an end face disk while passing by a retaining finger of the end disk.

FIG. 11 is used to describe steps e') and f') of the process. In these steps, similar to steps e) and f), the wire moving means 1' is then rotated in a corresponding manner such that the winding wire 30 is installed in the corresponding winding wire receiver space 13 while rotating the stator plate to a next stator slot to be provided with windings corresponding to the winding pattern. As above, these steps are then carried out repeatedly until the stator plate is completely provided with windings.

As a consequence, the essential difference between the first preferred process and the second preferred process is that only the wire moving means 1', which is designed in the shape of a hook on its free end, moves through the stator core 117 and is correspondingly pivoted on the supporting arm 2'. Thus, the supporting arm 2' does not also have to be moved through the stator core 117. This alleviates possible difficulties with stator plates having small dimensions, i.e., stators which have a stator core 117 with relatively small dimensions such that the supporting arm 2' in most cases would not be able to pass through.

Of course, the present invention is not limited to the details explained above in connection with the process, the end face disk 10 and the wire moving means 1, 1', but, of course, numerous variations and modifications both with regard to the details and the entire combination are possible. Especially with regards to the end face disks 10 which may be arranged and designed other than as shown. The same is true with respect to the wire moving means 1, 1'. Although, it is essential in the processes of the present invention in order to provide a stator plate 100 with windings with a winding pattern of greater than 1, end face disks 10 can be provided which form a winding wire receiver space 13 such that the winding wire 30 can be installed axially and radially outside of the stator slots 101 to 116 in such a manner that a stator slot 101 to 116 which may be skipped is skipped is not covered but kept clear so that the slot may be provided with windings in the subsequent winding sequence.

Further, in order to enable the windings to be performed fully automatically, preferably with the use of a corresponding programmable or learning programmable control, the wire moving means 1, 1' may not only carry out a translational linear movement, but is also rotatable and pivotable about its axis of rotation 4,4' perpendicular to its longitudinal axis. This is necessary in order to be able to install the winding wire 30 in the winding wire receiver space 13 of the end face disks 10. At the same time, the courses of movement may be superimposed, of course, which otherwise also applies to the individual, specific process steps a) to h) or a') to b'). Thus, with movement on multiple axes or superimposed entire movements of the stator plate 100 and the wire moving means 1,1', obtained by means of this, a freely selectable and random winding pattern having a winding pitch of greater than 1 may be provided.

What is claimed is:

1. A system for winding a winding wire on a stator plate at a winding pitch greater than 1, the stator plate comprising a stator core, a plurality of stator slots and an end face disk mounted on an end of said stator plate, the end face disk comprising a plurality of radially projecting retaining fingers that each have a winding wire receiver space, each of said retaining fingers being located between two stator slots, the system comprising:

a wire moving means, mounted on a support arm that has a longitudinal axis, for winding the winding wire in the stator slots by moving along the longitudinal axis of the support arm and for installing the winding wire in between two of the radially projecting retaining fingers by rotating about an axis of rotation that is in an angular relationship with the longitudinal axis of the support arm; and a stator rotating means for rotating the stator core about its longitudinal axis to a stator slot to be wound by the wire moving means.

2. The system according to claim 1, wherein the stator slots each have a top that has a radial height and a bottom that has a radial height and wherein the winding wire receiver spaces are formed between a circumferential edge flange of the end face disk and each of the retaining fingers.

3. The system according to claim 2, wherein the winding wire receiver spaces have a lower radial height that is less than the radial height of the top of the stator slots and greater than the radial height of the bottom of the stator slots.

4. The system according to claim 1, further comprising a rotary drive means mounted on an end of the support arm for generating a rotary movement of the wire moving means.

5. The system according to claim 4, wherein the rotary drive means comprises one of a belt drive, a chain drive and a sliding gear drive.

6. The system according to claim 1, wherein said wire moving means further comprises a blocking cylinder for controlling the position of the wire moving means.

7. The system according to claim 1, wherein said wire moving means further comprises a hook shaped free end.

8. The system according to claim 1, wherein the stator plate further comprises a plurality of pins mounted on a side of the end face disk for installing the winding wire.

9. The system according to claim 8, wherein the wire moving means further comprises a wrapping means for wrapping the winding wire around one of the pins.

10. The system according to claim 9, wherein the wrapping means comprises a longitudinal axis and is rotatable about the longitudinal axis to wrap the winding wire around one of the pins.

11. A system for winding a winding wire on a stator plate at a winding pitch greater than 1, the stator plate comprising a stator core, a plurality of stator slots and an end face disk mounted on an end of said stator plate, the end face disk comprising an electrically insulating material and a plurality of radially projecting retaining fingers that each have a winding wire receiver space, each of said retaining fingers being located between two stator slots, the system comprising:

a wire moving means mounted on a support arm that has a longitudinal axis, for winding the winding wire in the stator slots by moving along the longitudinal axis of the support arm and for winding the wire in between two of the radially projecting retaining fingers by rotating about a rotational axis that is substantially perpendicular to the longitudinal axis of the support arm; and a stator rotating means for rotating the stator core about its longitudinal axis to a stator slot to be wound by the wire moving means.

12. The system according to claim 11, wherein the stator slots each have a top that has a radial height and a bottom that has a radial height and the winding wire receiver spaces are formed between a circumferential edge flange of the end face disk and each of the retaining fingers.

13. The system according to claim 12, wherein the winding wire receiver spaces have a lower radial height that is less than the radial height of the top of the stator slots and greater than the radial height of the bottom of the stator slots.

14. The system according to claim 11, further comprising a rotary drive means mounted on the support arm for generating movement of the wire moving means about the rotational axis.

15. The system according to claim 14, wherein the wire moving means is mounted on one end of the support arm and the rotary drive means is mounted on the other end of the support arm.

16. The system according to claim 11, wherein said wire moving means further comprises a blocking cylinder for controlling the position of the wire moving means.

17. The system according to claim 11, wherein said wire moving means further comprises a hook shaped free end.

18. The system according to claim 11, wherein the stator plate further comprises a plurality of pins mounted on a side of the end face disk for installing the winding wire.

19. The system according to claim 18, wherein the wire moving means further comprises a wrapping means for wrapping the winding wire around one of the pins.

20. The system according to claim 19, wherein the wrapping means comprises a longitudinal axis and is rotatable about the longitudinal axis to wrap the winding wire around one of the pins.

* * * * *